United States Patent
Zhong

[19]

[11] Patent Number: 6,094,562

[45] Date of Patent: Jul. 25, 2000

[54] TIMING COMPENSATION FOR DISTANT BASE STATION ANTENNAS IN TELECOMMUNICATION SYSTEMS

[75] Inventor: Lizhi Zhong, Parsippany, N.J.

[73] Assignee: Lucent Technologies Inc., Murray Hill, N.J.

[21] Appl. No.: 09/056,174

[22] Filed: Apr. 7, 1998

[51] Int. Cl.[7] .............................. H04B 17/00; H03C 7/02; H04J 3/06

[52] U.S. Cl. ....................... 455/67.6; 455/562; 455/101; 370/519

[58] Field of Search .................................. 455/456, 69.6, 455/101, 67.6, 503, FOR 109; 370/335, 342, 319, 320, 516, 517, 518, 519, 350; 375/356, 371, 200

[56] References Cited

U.S. PATENT DOCUMENTS

| | | | |
|---|---|---|---|
| 5,710,768 | 1/1998 | Ziv et al. | 370/342 |
| 5,745,484 | 4/1998 | Scott | 370/347 |
| 5,781,541 | 7/1998 | Schneider | 370/335 |
| 5,784,364 | 7/1998 | Ahn et al. | 370/335 |
| 5,802,044 | 9/1998 | Baum et al. | 370/330 |
| 5,805,983 | 9/1998 | Naidu et al. | 455/67.6 |
| 5,872,774 | 2/1999 | Wheatley, III et al. | 370/335 |
| 5,881,058 | 3/1999 | Chen | 370/335 |
| 5,907,813 | 5/1999 | Johnson, Jr. et al. | 455/502 |

OTHER PUBLICATIONS

"Mobile Station Base Compatibility Standard for Dual-Mode Wideband Spread Spectrum Cellular System", TIA/EIA/IS–95–A, 1995.

*Primary Examiner*—Reinhard J. Eisenzopf
*Assistant Examiner*—Charles N. Appiah
*Attorney, Agent, or Firm*—Steve Mendelsohn

[57] ABSTRACT

Each reverse-link signal received by a base station from a mobile unit is advanced by a specified receive delay corresponding to the reverse-link delay between the base station and its antenna. In a configuration in which the base station has more than one antenna, the receive delay is preferably based on empirical measurements for the antenna having the smallest reverse-link delay. In a configuration in which the base station has more than one sector, a different receive delay is preferably specified for each different sector. By compensating for reverse-link delay, the delay budget can be greatly increased, especially when the antenna is far from the base station. In addition, for applications in which the search window begins at about GPS time 0, the base station more efficiently utilizes its processing capacity by reducing the portion of the base station search window within which no reverse-link signal can be present.

18 Claims, 1 Drawing Sheet

TIMING COMPENSATION FOR DISTANT BASE STATION ANTENNAS IN TELECOMMUNICATION SYSTEMS

BACKGROUND OF THE INVENTION

1. Field of the Invention

The present invention relates to communication systems, and, in particular, to mobile telephony systems that conform, for example, to the IS-95 standard.

2. Description of the Related Art

FIG. 1 shows a block diagram of part of a mobile telephony system conforming to the IS-95 standard. In the forward link, signals from base station 102 are transmitted by base station antenna 106 to mobile unit 104. Analogously, in the reverse link, signals from mobile unit 104 are received at base station antenna 106 for base station 102. Antenna 106 is typically hard-wired to base station 102 and signals are transmitted between base station 102 and antenna 106 over that hard-wire connection 108.

The timing of the transmission of forward-link signals within an IS-95 communication system is based on a global positioning system (GPS) time reference (called "GPS time 0") derived at the base station, using a GPS receiver (not shown). Each mobile unit derives its own time reference based on the earliest arriving multi-path component of the forward-link signals transmitted by the base station. Each mobile unit uses its derived time reference to control the timing of the transmission of reverse-link signals.

In an IS-95 communication system, there will be a forward-link delay between the time at which forward-link signals are time-stamped by a base station and the time at which the signals are actually transmitted by each of its antennas. These forward-link delays are due, at least in part, to the physical separations between the base station and its antennas, such as that shown in FIG. 1, which separations may vary from antenna to antenna and from base station to base station in a communication system. Processing delay (e.g., from D/A conversion and modulation) also contributes to the duration between time-stamping and actual transmission.

According to the IS-95 specification, a base station advances the timing of the forward-link signals by an amount (called the transmit delay) corresponding to the smallest forward-link delay between time-stamping at the base station and actual transmission by one of the base station antennas, so that the actual transmission of signals by that base station antenna will begin at GPS time 0. The magnitude of this transmit delay is based on empirical measurements made when the base station and antenna are first configured. For base stations that have two or more different antennas, the transmit delay is based on the antenna having the smallest forward-link delay. Each mobile unit will derive its own time reference based on the earliest arriving multi-path component of the forward-link signals transmitted by the base station and use the derived time reference to transmit reverse-link signals back to the base station.

The base station defines an access-channel search window within which the base station scans for reverse-link signals transmitted by the mobile unit in the access channel. In conventional IS-95 systems, the base station access-channel search window may begin, but does not have to begin, at GPS time 0.

Referring again to FIG. 1, as in the forward link, for each base station antenna, there will be a reverse-link delay between the time at which reverse-link signals are received at each base station antenna (e.g., 106) and the time at which the received reverse-link signals are processed by base station 102. This reverse-link delay is due at least in part to the time that it takes to transmit the received signals from antenna 106 to base station 102 over hard-wire connection 108. In general, for base stations with more than one antenna, the smallest reverse-link delay is referred to as the receive delay. The existence of these reverse-link delays means that no signals received from a mobile unit, such as mobile unit 104, will ever be present at the base station before the expiration of the receive delay. This will cause the arrival range of the reverse signal to be shifted by the receive delay. As a result, the upper limit of the base station access-channel search window is also shifted by the receive delay.

The upper limit of the base station access-channel search window is related to the virtual cell size and the receive delay between antenna 106 and base station 102. Based on hardware constraints and the pilot PN code reuse factor, the upper limit has to be less than a specified value. The virtual cell size is decided by the maximum differential delay (i.e., the maximum difference in reverse-link delay between any two antenna connectors in the same base station sector), the probe randomization delay (i.e., a delay that the mobile unit waits before transmitting a probe in the access channel), and the cell size (i.e., the radius of the coverage area for the antenna connector with the largest coverage area in a particular sector). These three values that are used to determine the virtual cell size are typically large. The value of the virtual cell size is confined by the upper limit of the base station access-channel search window minus the receive delay. This constraint is referred to as the delay budget. Thus, the larger the receive delay, the tighter the delay budget. Furthermore, the tighter the limit on the virtual cell size, the harder it is to configure the base station to stay within the delay budget.

SUMMARY OF THE INVENTION

The present invention is directed to a scheme for increasing the delay budget for configuring a base station. According to the present invention, each base station compensates its processing for receive delay. In particular, the received signal is advanced by a value corresponding to the size of the receive delay. In this way, the delay budget is increased by the receive delay, thereby making the base station easier to configure within the delay budget constraint, especially in the case where the antenna is far away from the base station implying that the receive delay is very large.

According to one embodiment, the base station of a communication system has an access-channel search window used to scan for a mobile access attempt, wherein the base station advances the reverse-link signal by a specified non-zero receive delay in order to increase the delay budget. Although the present invention provides advantages in IS-95 systems having access channels, the present invention may also be implemented in other channels of other types of communication systems.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 2:
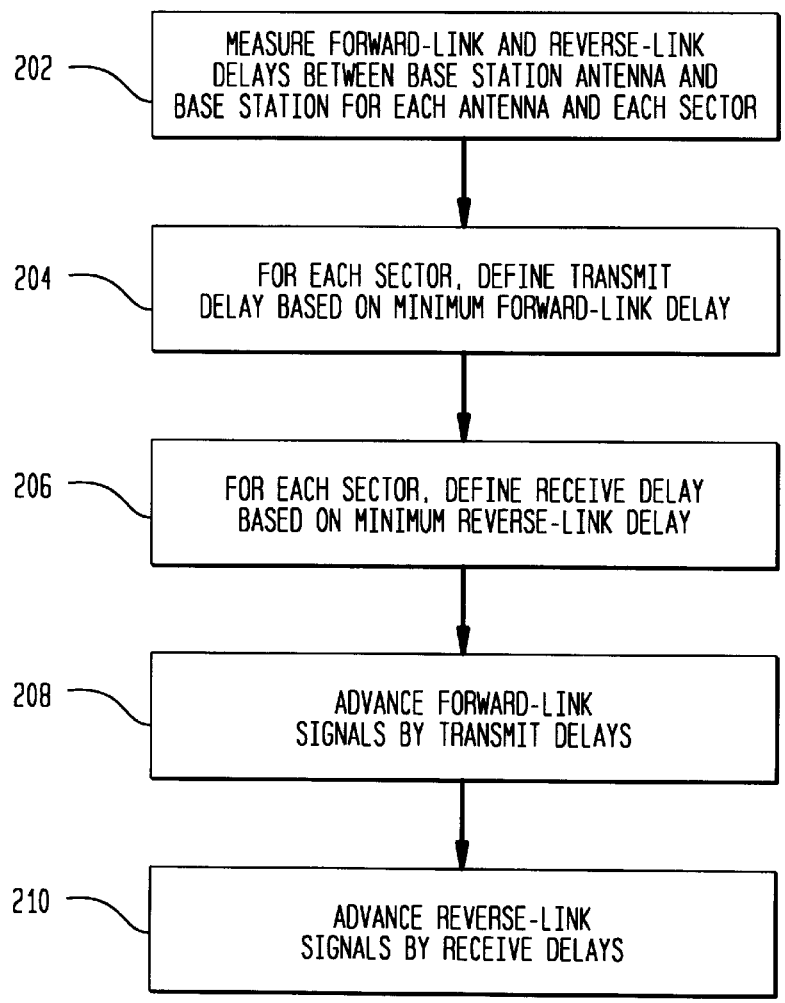
FIG. 2 shows a flow diagram of the processing implemented, according to one embodiment of the present invention.

FIG. 2 shows a flow diagram of the processing implemented, according to one embodiment of the present invention. According to this embodiment, the reverse-link signal received at a base station is advanced by an amount equivalent to the receive delay between the base station and its antenna. In a configuration in which a base station has more than one antenna, the advancement of the received signal is preferably based on the antenna having the minimum reverse-link delay. In this way, signals received by each and every antenna will be able to be detected at the base station. For configurations in which a base station has two or more sectors, a different receive delay can be assigned for each sector. The specified receive delay values may be stored in computer memory within each base station.

Each receive delay value is preferably based on empirical measurements of reverse-link delays made when the cell site is initially configured. These values are preferably fixed until the configuration is changed, at which time, new measurements should be made to determine if the selected values should be updated.

Figure 1:
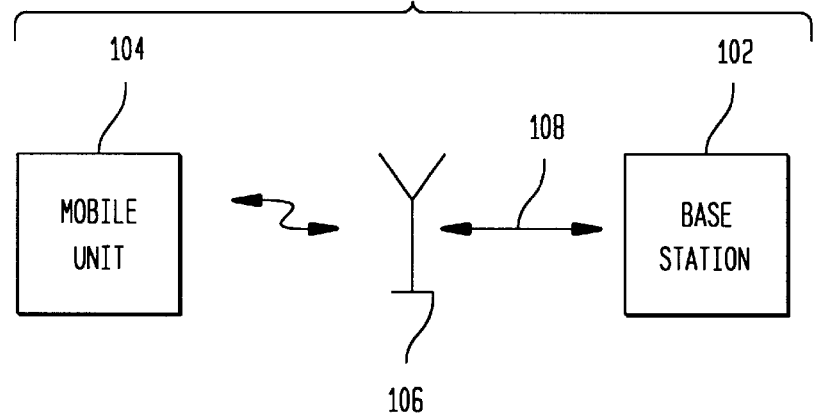
FIG. 1 shows a block diagram of part of a mobile telephony system conforming to the IS-95 standard.

In particular, when the cell site is initially configured, the forward-link and reverse-link delays are measured between the base station, e.g., base station 102 of FIG. 1, and each base station antenna, e.g., antenna 106, for each sector in the cell site (step 202 of FIG. 2). For each sector, a transmit delay value is selected based on the minimum forward-link delay for the antennas in the sector (step 204), and a receive delay value is selected based on the minimum reverse-link delay for the antennas in the sector (step 206).

In accordance with the IS-95 specification, the forward-link signals are advanced by the selected transmit delay (step 208), in order for the forward-link signals to be transmitted by the antenna with the smallest forward-link delay at GPS time 0. In accordance with embodiments of the present invention, the base station advances the reverse-link signals received from a mobile unit by the selected receive delay (step 210). This ensures that the base station access-channel search window will only begin when reverse-link signals can possibly be present (e.g., signals received by the antenna having the smallest reverse-link delay). For an application in which the access-channel search window starts at about GPS time 0, little or no processing capacity in the base station will be wasted searching for signals that cannot yet have arrived due to the delay between the antenna and the base station. In addition, and more importantly, under the present invention, the delay budget is increased by the receive delay.

The present invention provides advantages during hand-offs between sectors, either between sectors of the same cell site or between sectors of different cell sites, since each sector will have its own specified receive delay. According to conventional schemes, when a mobile unit participates in hand-offs, since the receive delay may be different from one sector to another, the position of the access-channel search window in the new leg is impacted by the difference between the receive delays of the sectors involved in the hand-off. Under the scheme of the present invention, however, for hand-offs, since the receive delay is compensated differently for different sectors, the difference between the sectors is eliminated and the position of the access-channel search window in the new leg is independent of the receive delay. As such, the processing is greatly simplified.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing a received reverse-link signal in a base station of a communication system, the base station having a search window used to scan for the received reverse-link signal, wherein the base station advances the received reverse-link signal by a specified non-zero receive delay in order to increase the delay budget, wherein the receive delay corresponds to reverse-link delay between the base station and a base station antenna.

2. The invention of claim 1, wherein the base station has two or more base station antennas and the receive delay is based on the base station antenna having the smallest reverse-link delay.

3. The invention of claim 1, wherein the base station has two or more sectors and a different receive delay is specified for each sector.

4. The invention of claim 1, wherein the receive delay is based on empirical measurements made when the base station is initially configured.

5. The invention of claim 4, wherein the receive delay is updated when the base station is reconfigured.

6. The invention of claim 1, wherein the communication system conforms to the IS-95 standard and the search window is an access-channel search window.

7. The invention of claim 1, wherein, for an application in which the search window starts at about GPS time 0, advancing the reverse-link signal by the receive delay, decreases the portion of the base station search window within which the reverse-link signal cannot be present due to the reverse-link delay between the base station and the base station antenna.

8. The invention of claim 1, wherein
   the base station has two or more base station antennas and the receive delay is based on the base station antenna having the smallest reverse-link delay;
   the base station has two or more sectors and a different receive delay is specified for each sector;
   the receive delay is based on empirical measurements made when the base station is initially configured;
   the receive delay is updated when the base station is reconfigured; and
   the communication system conforms to the IS-95 standard and the search window is an access-channel search window.

9. A base station of a communication system, the base station having a search window used to scan for a received reverse-link signal, wherein the base station advances the received reverse-link signal by a specified non-zero receive delay in order to increase the delay, budget wherein the receive delay corresponds to reverse-link delay between the base station and a base station antenna.

10. The invention of claim 9, wherein the base station has two or more base station antennas and the receive delay is based on the base station antenna having the smallest reverse-link delay.

11. The invention of claim 9, wherein the base station has two or more sectors and a different receive delay is specified for each sector.

12. The invention of claim 9, wherein the receive delay is based on empirical measurements made when the base station is initially configured.

13. The invention of claim 12, wherein the receive delay is updated when the base station is reconfigured.

14. The invention of claim 9, wherein the communication system conforms to the IS-95 standard and the search window is an access-channel search window.

15. The invention of claim 9, wherein, for an application in which the search window starts at about GPS time 0, advancing the reverse-link signal by the receive delay, decreases the portion of the base station search window within which the reverse-link signal cannot be present due to the reverse-link delay between the base station and the base station antenna.

16. The invention of claim 9, wherein
the base station has two or more base station antennas and the receive delay is based on the base station antenna having the smallest reverse-link delay;
the base station has two or more sectors and a different receive delay is specified for each sector;
the receive delay is based on empirical measurements made when the base station is initially configured;
the receive delay is updated when the base station is reconfigured; and
the communication system conforms to the IS-95 standard and the search window is an access-channel search window.

17. A method for processing a reverse-link signal in a base station of a communication system, the base station having a search window used to scan for the reverse-link signal, wherein the base station advances the reverse-link signal by a specified non-zero receive delay in order to increase the delay budget, wherein, for an application in which the search window starts at about GPS time 0, advancing the reverse-link signal by the receive delay, decreases the portion of the base station search window within which the reverse-link signal cannot be present due to reverse-link delay between the base station and a base station antenna.

18. A base station of a communication system, the base station having a search window used to scan for a reverse-link signal, wherein the base station advances the reverse-link signal by a specified non-zero receive delay in order to increase the delay budget, wherein, for an application in which the search window starts at about GPS time 0, advancing the reverse-link signal by the receive delay, decreases the portion of the base station search window within which the reverse-link signal cannot be present due to reverse-link delay between the base station and a base station antenna.

* * * * *